H. D. PERKY, DEC'D.
L. SPARKS, ADMINISTRATOR.
MACHINE FOR REDUCING GRAIN PRODUCTS TO COMPOSITE FORMS OF FOOD.
APPLICATION FILED APR. 2, 1906.

912,976.

Patented Feb. 16, 1909.
5 SHEETS—SHEET 1.

Witnesses—
George M. Anderson.
Stuart Hilder

Inventor,
Henry D. Perky,
by E. W. Anderson, his Atty.

H. D. PERKY, DEC'D.
L. SPARKS, ADMINISTRATOR.
MACHINE FOR REDUCING GRAIN PRODUCTS TO COMPOSITE FORMS OF FOOD.
APPLICATION FILED APR. 2, 1906.

912,976.

Patented Feb. 16, 1909.
5 SHEETS—SHEET 2.

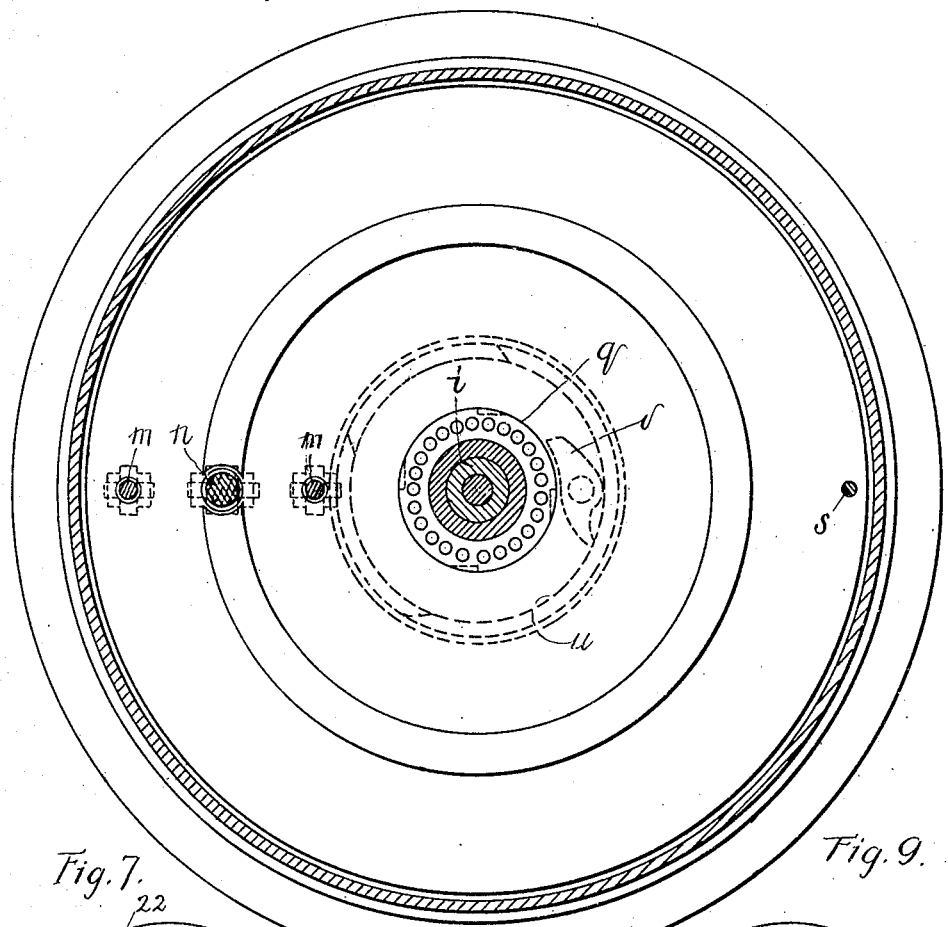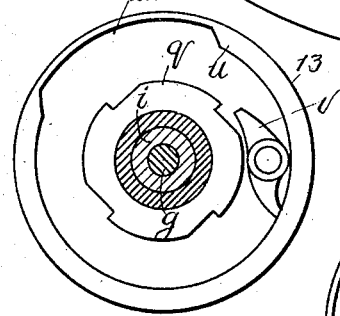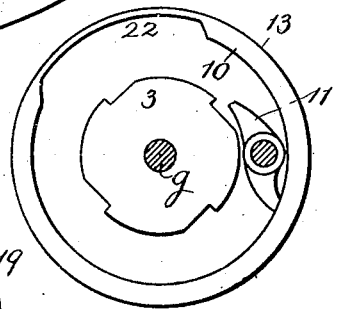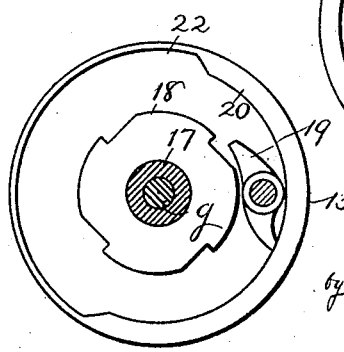

H. D. PERKY, DEC'D.
L. SPARKS, ADMINISTRATOR.
MACHINE FOR REDUCING GRAIN PRODUCTS TO COMPOSITE FORMS OF FOOD.
APPLICATION FILED APR. 2, 1906.

912,976.

Patented Feb. 16, 1909.

5 SHEETS—SHEET 5.

UNITED STATES PATENT OFFICE.

HENRY D. PERKY, GLENCOE, MARYLAND; LABAN SPARKS ADMINISTRATOR OF SAID HENRY D. PERKY, DECEASED.

MACHINE FOR REDUCING GRAIN PRODUCTS TO COMPOSITE FORMS OF FOOD.

No. 912,976.          Specification of Letters Patent.          Patented Feb. 16, 1909.

Application filed April 2, 1906. Serial No. 309,279.

*To all whom it may concern:*

Be it known that I, HENRY D. PERKY, a citizen of the United States, and resident of Glencoe, in the county of Baltimore and State of Maryland, have made a certain new and useful Invention in Machines for Reducing Grain Products to Composite Forms of Food; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
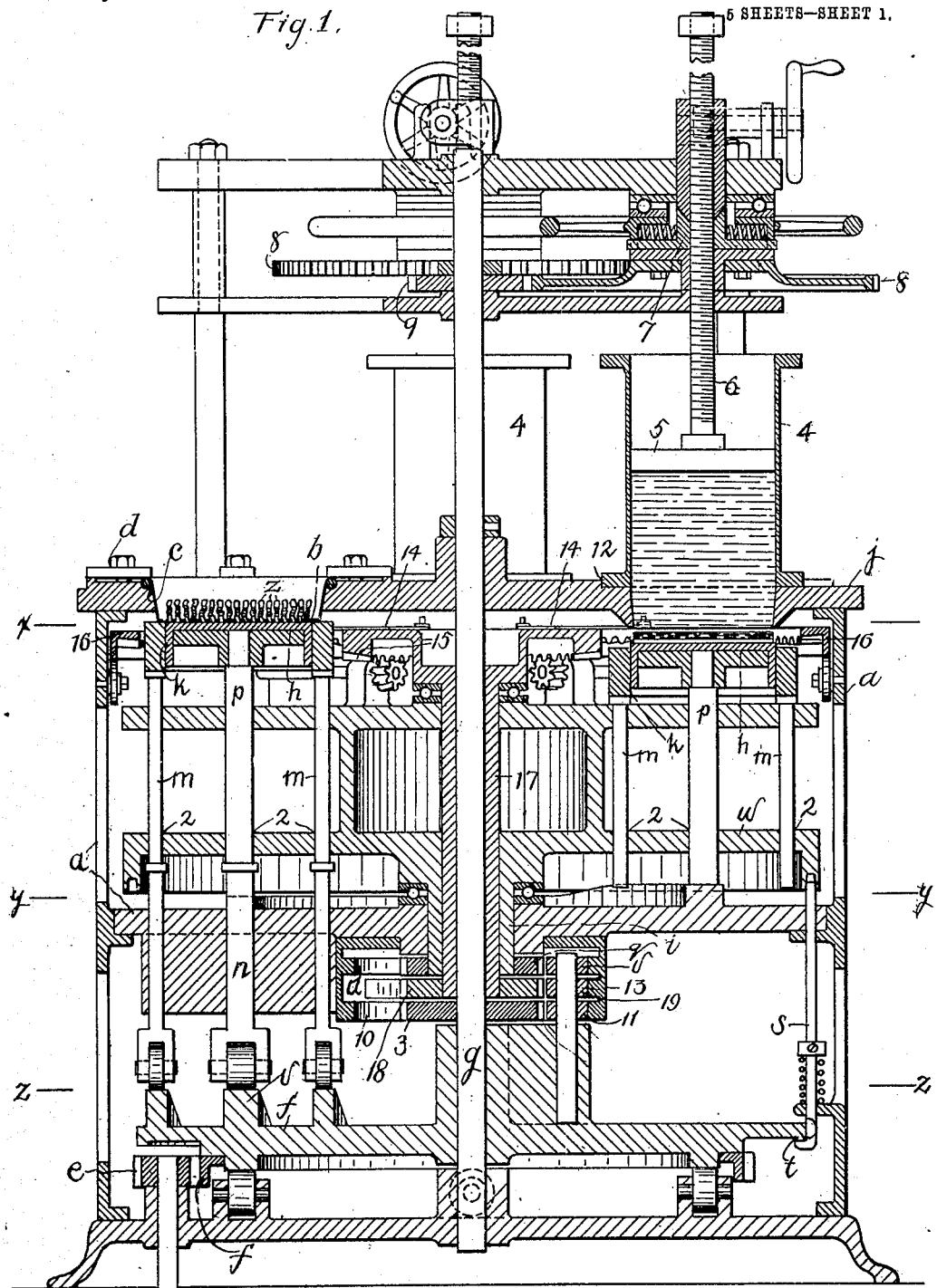
Figure 2:
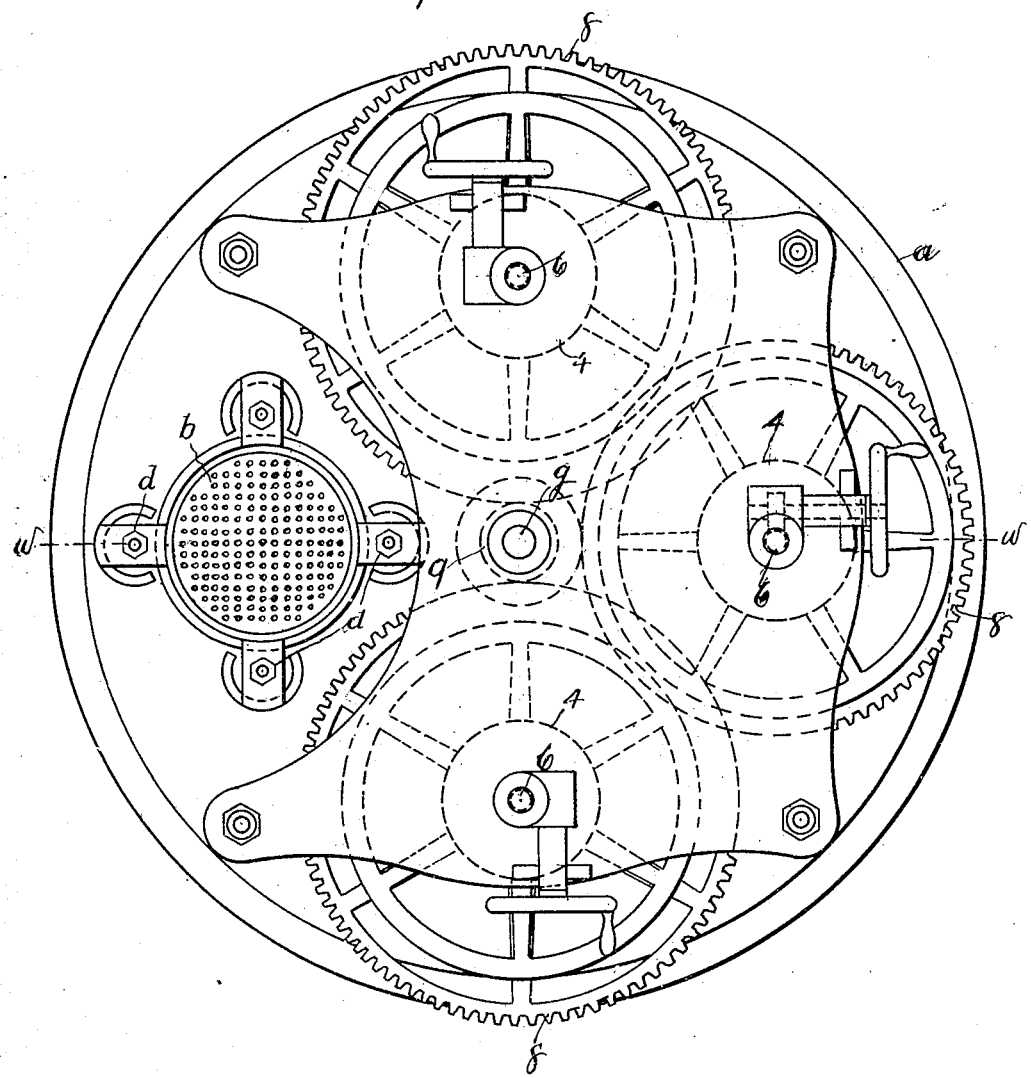
Figure 3:
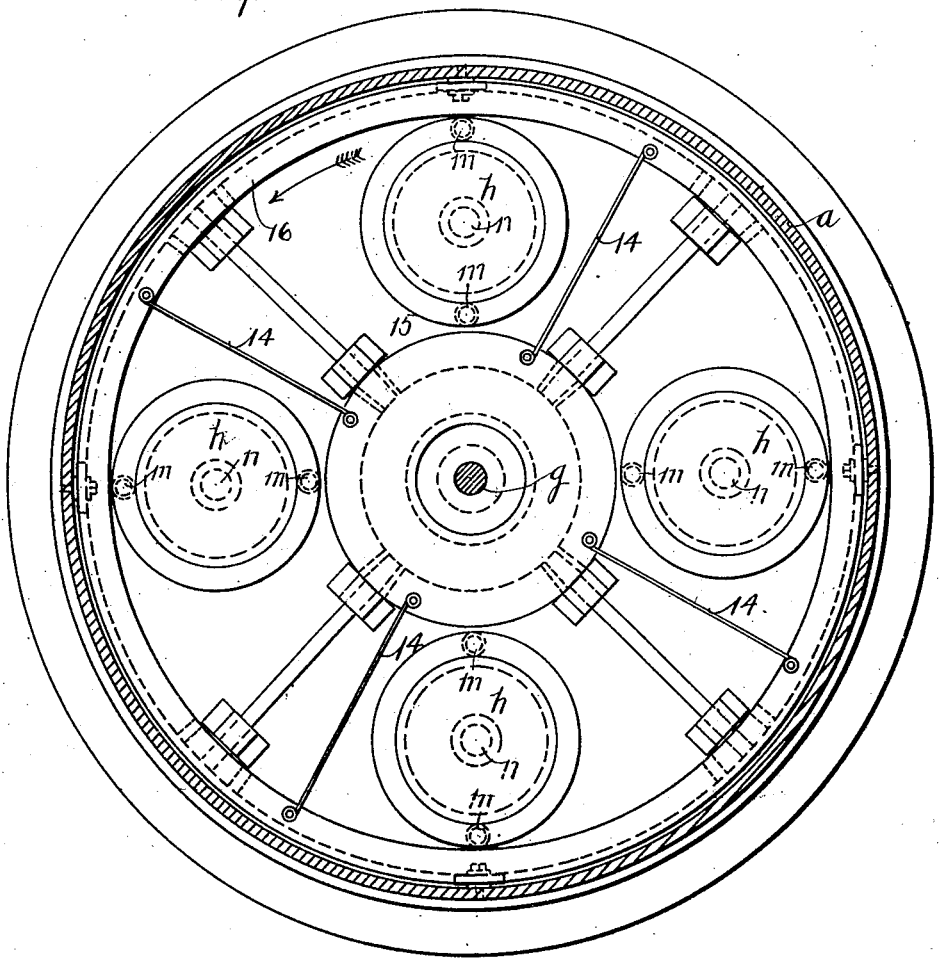
Figure 5:
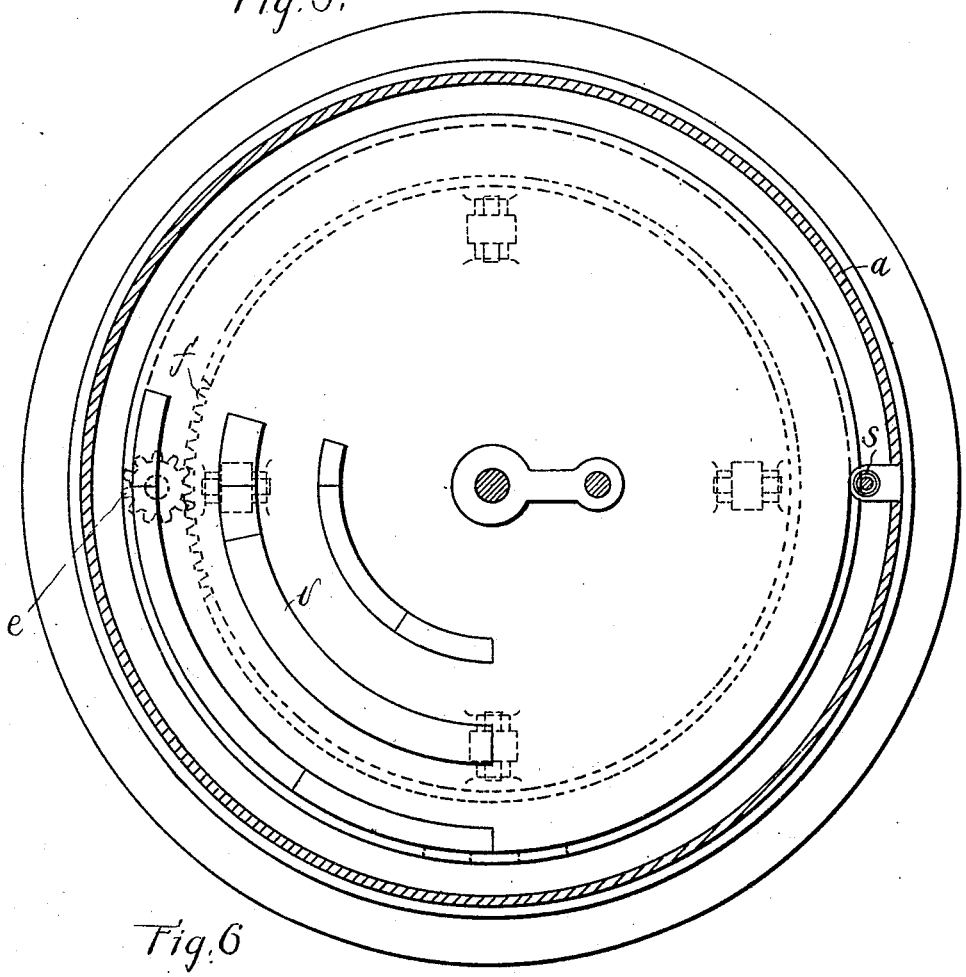
Figure 6:
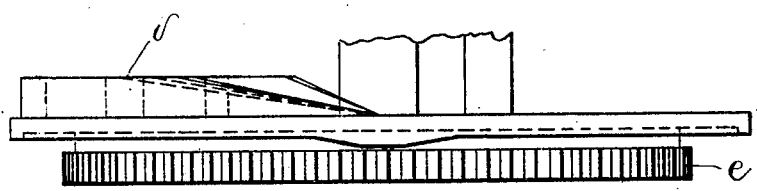

Figure 1 is a vertical central sectional view of the machine. Fig. 2 is a plan view of the same. Fig. 3 is a horizontal section on the line $x$—$x$. Fig. 4 is a horizontal section on the line $y$—$y$. Fig. 5 is a horizontal section on the line $z$—$z$. Figs. 6, 7 and 8 are detail views.

The object of the invention is to provide a machine for producing in a continuous manner, and in large quantities, elongated composite forms of different varieties or kinds of material, such forms having a sectional or jointed character, while being entire in structure, and having different varieties of material, forming, respectively, the different sections.

The invention is designed for use, chiefly, in connection with grain products or cereal materials, and it is illustrated in the machine shown in the accompanying drawings, in which the letter $a$, designates frame work, and $b$, a perforated plate or pan secured on a seat $c$, of said frame, by means of clamps $d$.

A drive pinion $e$, has its bearing in the base of the frame, and engages the horizontal pressure wheel $f$, which is designed to have roller bearings, and through which the central vertical shaft $g$, extends.

Below the seat $c$, of the frame, and bearing on the wheel $f$, are drive arms $n$, having bearings in the frame $a$, and designed to operate press devices consisting each of a follower $h$, a press cylinder or ring $k$, which is movable, a follower stem $p$, and slide rods $m$, supporting the ring $k$. The arms $n$, are operated by cam ribs $v$, which are provided on the gear wheel $f$. As this wheel is turned by the driving pinion, the pressure arms $n$, on which the stem $p$, and pins or rods $m$, are brought to bear, at the proper time, are caused to move upward with the follower and the press ring and to thereby press thin slices of material which have been piled on the follower, through the perforations of the reducing plate $b$, whereby such material is molded into elongated forms, as indicated at $z$.

The marginal portion of the base gear wheel $f$, is provided with a cam, indicated at $t$, designed to actuate a locking pin $s$, the object of which is to lock the rotary bearing table $w$, in position while the press is acting to force the material through the perforations of the plate $b$. This bearing table $w$, is rotated in an intermittent manner, by means of the base wheel $f$ through the operation of an interior rib cam $u$, a dog, $v'$, and a ratchet wheel $q$, which is keyed to the hub $i$, of said table.

In this machine, there are four followers $h$, arranged in an equidistant manner above the table $w$, each follower having its press ring $k$, and stem $p$, and each press ring being supported by slide rods $m$. The follower stems and slide rods pass through bearings 2, of the table. Above the bearing table and on the seat plate $j$, of the frame, are located three removable press cylinders 4, each of which is provided with a follower 5, having a screw stem 6, engaging a spring nut 7, designed to be actuated by frictional engagement with a gear wheel 8, in engagement with a pinion 9, on the center shaft $g$. These press cylinders 4, are designed to be located on three sides of the frame, the fourth side having the seat $c$, in which is received the perforated reducing plate $b$. To the central shaft $g$, is secured a ratchet wheel 3, which is designed to be operated intermittently by means of a rib-cam 10, on the interior of the cam box 13, through the medium of a dog 11. The table $w$, is thus designed to be rotated in an intermittent manner to bring the four followers $h$, to their positions, respectively, under the three pressure feed cylinders 4, and the perforated reducing plate $b$, by means of the dog $v$, in connection with the interior rib-cam $u$. And the feed presses are actuated in an intermittent manner by means of the dog 11, in connection with the interior rib-cam 10.

The material in the feed cylinders is designed to be a plastic solid, prepared from cereal material, usually by cooking the ground grain, mixed with sufficient water for absorption, for a sufficient time. For this purpose, the mixed cereal material and water may be inclosed in a water tight vessel, and cooked in said vessel by immersing the same in hot water or steam. The press cylinder 4, when provided with removable water tight caps or end plates will serve for the cooking vessel, and it is therefore designed to be removable from its bearing 12, on the plate j, of the frame. As soon thereafter, as the press devices have been operated to force the piled material from one of the followers h, through the perforations of the reducing plate, this follower descends, and the feeding presses are then operated to protrude a small portion of the plastic solid material from each cylinder 4, below its open bottom, while the followers h, are in transit. This portion of the plastic solid has a plane bottom surface, and, under the operation of the machine, a thin slice is designed to be cut therefrom and deposited on a follower.

In order to illustrate the invention, the varieties of grain used, may be white corn and yellow corn. The white material may be charged in the middle feed cylinder, and the yellow material, in the two other feed cylinders. As each follower is designed to receive a slice of material from each cylinder in turn, a pile is formed on such follower, consisting of a white slice of material between two yellow slices, and when the material of this pile is forced by the follower, under the operation of the pressure arm, actuating its stem, and the cam of the pressure gear wheel, through the perforations of the reducing plate b, the elongated forms produced will be composite, showing a white middle portion and yellow end portions or tips. In cutting off the slices to be deposited, fine wires 14, may be used, such wires extending radially from a middle gear wheel 15, across the path of the followers to a peripheral gear wheel 16. The middle gear wheel 15, is secured to a sleeve shaft 17, which is provided at its lower portion with a ratchet wheel 18, which engages a dog 19, while such dog is put in action by the internal rib-cam 20, of the cam-box 13, which is fixed to the frame.

The dogs v, 11 and 19 are spring dogs, and the cams u, 10 and 20, are hold-off cams, having recesses 22, whereby the tails of the dogs are freed to allow the dogs to engage their respective ratchets. The cams are timed to operate the dogs in the manner above indicated. The recesses of the cams v, and 11, are quadrant recesses, and that of the cam 20 extends over an arc of one hundred and eighty degrees. In this manner it is designed to provide that the movement of the four cutting wires shall take place, not only while the followers h, are stationary under the feed cylinders, but also while such followers are in motion, all the dogs being put in action at the same time.

The cycle of operation is designed in the machine illustrated to be as follows:—The follower, which has been pushed upward under the reducing plate, moves downward; then the turning movement takes place to shift the followers, and feed the material downward from the feed cylinders, then the wires are operated to cut off the slices and deposit them on the followers respectively under such cylinders, such wires moving forward to next position, and, finally the upward pressure is made on the fully charged follower to effect the reduction.

What I claim as my invention, and desire to secure by Letters Patent is—

1. A press machine for reducing plastic material to elongated forms, having, in combination with a perforated reducing plate, and a press device below said plate, shifting followers, means for feeding material to said followers, means for shifting said followers, and means for operating the press device.

2. A press machine for reducing plastic material to elongated forms, having, in connection with a removable perforated plate, and a drive arm in axial line therewith, shifting press rings and followers, means for feeding material to said followers, means for shifting said rings and plates, and means for operating said drive arms.

3. A press machine of the class described, having a removable perforated plate and shifting followers, means for cutting slices of material and means for feeding such slices in piles to the followers.

4. A press machine of the class described having a reducing plate, shifting followers, means for feeding portions of material to such followers, and means for operating said followers, severally, to effect action by said reducing plate.

5. In a press machine of the class described, the combination with a reducing plate, and shifting followers, of means for feeding material to said followers, and a pressure device common to said followers.

6. In a machine of the class described, the combination with a reducing plate and a shifting follower, of a slice piling device, and means for operating said follower in connection with means for operating said slice piling device.

7. In a machine of the class described, the combination with a reducing plate and a press drive below the same, of feed chutes for the material, intermittently acting slicing devices, and means for operating said followers, and said slicing devices.

8. In a machine of the class described, the combination with a perforated reducing plate and a pressure drive, of a shifting follower, means for feeding material to said follower, and means for operating said pressure drive.

9. In a machine of the class described, the combination with a perforated reducing plate, of a follower, means for slicing material, and means for piling slices on said follower.

10. A machine for reducing plastic material to composite forms, having a reducing plate, and shifting followers, means for feeding the material, means for slicing and depositing the slices on the followers in piles, and a pressure device common to said followers.

In testimony whereof I affix my signature, in presence of two witnesses.

HENRY D. PERKY.

Witnesses:
PETER MULCAHY,
BESSIE MULLINEAUX.